United States Patent
Bitto et al.

(10) Patent No.: US 12,535,350 B2
(45) Date of Patent: Jan. 27, 2026

(54) VIBRATION-TYPE MEASURING SENSOR AND VIBRONIC MEASURING SYSTEM FORMED THEREWITH

(71) Applicant: Endress+Hauser Flowtec AG, Reinach (CH)

(72) Inventors: Ennio Bitto, Aesch (CH); Walter Kamber, Dietgen (CH); Benjamin Schwenter, Ettingen (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 296 days.

(21) Appl. No.: 18/255,390

(22) PCT Filed: Nov. 26, 2021

(86) PCT No.: PCT/EP2021/083170
§ 371 (c)(1),
(2) Date: Jun. 1, 2023

(87) PCT Pub. No.: WO2022/117456
PCT Pub. Date: Jun. 9, 2022

(65) Prior Publication Data
US 2024/0027250 A1    Jan. 25, 2024

(30) Foreign Application Priority Data
Dec. 3, 2020 (DE) ............... 10 2020 132 223.2

(51) Int. Cl.
*G01F 1/84* (2006.01)
(52) U.S. Cl.
CPC ......... *G01F 1/8422* (2013.01); *G01F 1/8477* (2013.01)

(58) Field of Classification Search
CPC ............... G01F 1/8422; G01F 1/8477
USPC .................................... 73/861.354
See application file for complete search history.

(56) References Cited

U.S. PATENT DOCUMENTS

2020/0116612 A1*  4/2020  Ruetten ............... G01F 1/8431
2020/0200582 A1*  6/2020  Skinkle ............... G01F 1/8468

FOREIGN PATENT DOCUMENTS

| CN | 103052868 A | 4/2013 |
|---|---|---|
| DE | 4026724 A1 | 3/1992 |
| DE | 102010006863 | 3/2011 |
| DE | 102016125616 | 6/2018 |
| DE | 102019134606 | 6/2021 |

(Continued)

*Primary Examiner* — Nathaniel T Woodward
(74) *Attorney, Agent, or Firm* — Christopher R. Powers; Endress+Hauser (USA) Holding, Inc.

(57) ABSTRACT

A measuring transducer includes: a transducer module including a housing and a coil within and connected with the housing; and, set in the transducer module, a transducer module including a tube and a magnet secured on a middle segment of the tube. The tube wall is so formed that a directrix of a channel surface of the middle segment extends outside a first reference plane of the measuring transducer defined by first and fourth reference axes, and the magnet is secured on the middle segment such that a second reference plane of the measuring transducer defined by second and fourth reference axes is parallel to a third reference plane defined by third and fifth reference axes or that the second and third reference planes intersect one another to form an angle of intersection of no more than 1°.

13 Claims, 6 Drawing Sheets

(56) References Cited

FOREIGN PATENT DOCUMENTS

| WO | 2012150241 | 11/2012 |
|----|------------|---------|
| WO | 2019017891 | 1/2019 |
| WO | 2021121867 A1 | 6/2021 |

\* cited by examiner

VIBRATION-TYPE MEASURING SENSOR AND VIBRONIC MEASURING SYSTEM FORMED THEREWITH

CROSS-REFERENCE TO RELATED APPLICATIONS

The present application is related to and claims the priority benefit of German Patent Application No. 10 2020 132 223.2, filed on Dec. 3, 2020, and International Patent Application No. PCT/EP2021/083170, filed Nov. 26, 2021, the entire contents of which are incorporated herein by reference.

TECHNICAL FIELD

The invention relates to a vibration-type measuring transducer as well as to a vibronic measuring system formed therewith.

BACKGROUND

DE-A 40 26 724, WO-A 2019/017891 and applicant's own, not pre-published, international application PCT/EP2020/082922 disclose, in each case, vibronic measuring systems, especially Coriolis mass flow-measuring devices, formed by means of a modularly constructed measuring transducer of vibration-type as well as a measuring system-electronics electrically connected therewith. The measuring transducers are formed, in each case, by means of two transducer-modules, of which a (stationary) first transducer-module includes, in each case, a transducer-housing having at least one chamber surrounded, at least partially, by a housing wall as well as at least a (first) electrical coil placed within the transducer-housing and mechanically connected, especially releasably, therewith, and of which a second transducer-module includes, in each case, at least a (first) tube having a tube wall forming an outer, lateral surface of the tube and having a lumen surrounded by the tube wall as well as at least a (first) permanent magnet secured externally on the tube, namely on a middle-segment of the tube wall, especially connected by material bonding therewith, wherein the middle-segment of the tube wall extends between an inlet side, first segment-end and an outlet side, second segment-end spaced therefrom. The tube wall can be, for example, of metal or plastic. The second transducer-module is placed in the first transducer-module and connected mechanically releasably therewith, in such a manner that the second transducer-module sits fixed, i.e. is not movable, within the first transducer-module, wherein at least the middle-segment of the tube is situated within the chamber of the transducer-housing, and, equally as well, spaced from the housing wall and wherein the electrical coil and the permanent magnet form a solenoid. In the case of the measuring transducers shown in DE-A 40 26 724, WO-A 2019/017891, or PCT/EP2020/082922, the at least one tube is mechanically coupled with the transducer-housing, especially by means of an (inlet side) first connection-segment adjoining the first segment-end of the middle-segment and by means of an (outlet side) second connection-segment adjoining the second segment-end of the middle-segment, namely, at least indirectly, rigidly connected with the transducer-housing, in such a manner that movements of the first and second connection-segments relative to the transducer-housing are prevented, and that the second transducer-module sits fixed within the first transducer-module, and is not movable. The second transducer-module can, additionally, be formed replaceably, in such a manner that it is removable from the first transducer-module without damage, in given cases, also without the need of tools, for example, is removable from outside of the transducer-housing, for example, in order to be replaced on-site by another example of the second transducer-module, in given cases, also another example of the second transducer-module manufactured after production and delivery of the first transducer-module.

The at least one tube and its middle-segment can be at least sectionally straight and/or at least sectionally bent, for example, U-shaped or V-shaped. Additionally, the at least one tube is embodied to convey a flowing fluid in its lumen and during that, especially for the purpose of ascertaining measured values representing one or more measured variables of the fluid, to be caused to vibrate, in such a manner that the middle-segment executes oscillatory movements about a static resting position. For exciting and maintaining forced oscillations of the middle-segment of the at least one tube, the measuring transducer, and the measuring system formed therewith, includes an electromechanical exciter arrangement, wherein the exciter arrangement can be formed, for example, by means of the electrical coil and by means of the permanent magnet. Furthermore, the measuring transducer, and the measuring system formed therewith, includes an electromechanical sensor arrangement for registering forced oscillations of the middle-segment of the at least one tube and for providing one or more oscillation signals representing the oscillations of the middle-segment. Besides the first tube, the second transducer-module can, furthermore, have at least a second tube constructed equally to the first tube and, in the case of second transducer-module installed in the first transducer-module, placed identically to the first tube within the transducer-housing and mechanically connected, especially releasably, therewith.

These measuring transducers have (inherently) a number of imaginary reference axes, for example, in such a manner that a first reference axis imaginarily connects a midpoint (geometric center of gravity) of a planar first cross sectional area of the middle-segment comprising a flow cross section of the first segment-end and a midpoint of a planar second cross sectional area of the middle-segment comprising a flow cross section of the second segment-end, that a second reference axis coincides with a longitudinal axis of the electrical coil, and is determined by such longitudinal axis, and a third reference axis coincides with a longitudinal axis of the permanent magnet, and is determined by such longitudinal axis. Additionally, there can be defined a fourth reference axis of the measuring transducer intersecting both the first reference axis as well as also the second reference axis, in each case, perpendicularly, a fifth reference axis intersecting both the first reference axis as well as also the third reference axis, in each case, perpendicularly, as well as a sixth reference axis perpendicularly intersecting both the third reference axis as well as also a (directrix) of a channel area of the middle-segment established by the outer, lateral surface of the tube. Of the above described imaginary reference axes, additionally, the first and second reference axes define, in the case of tube in static rest position, an imaginary first reference plane of the measuring transducer, the second and fourth reference axes define an imaginary second reference plane of the measuring transducer, the third and fifth reference axes define a third reference plane of the measuring transducer and the third and sixth reference axes define a fourth reference plane of the measuring transducer. Typically, the permanent magnet in the case of conventional measuring transducers is so placed on the middle-segment, namely so positioned and so oriented, that a (surface-) normal of the fourth reference plane and a (surface-)normal of a flow cross section of the middle-segment, of which a midpoint corresponds to the intersection of the above described sixth reference axis with the directrix, or coincides therewith, are, relative to one another, essentially, or at least approximately, parallel, such that the two associated (reference-)surfaces are coplanar.

Investigations of such modular measuring transducers, and measuring system formed therewith, have shown that the accuracy of measurement, namely the accuracy with which the measured values for the at least one measured variable are ascertained by means of the particular example of the measuring system, can, after a replacement of a current example of (only) the second transducer-module with a nominally equally constructed, new example of the second transducer-module, for example, also one manufactured only after manufacture and delivery of the first transducer-module, at times, turn out to be less than earlier achieved accuracy of measurement, and that the accuracy of measurement of the measuring system can, in considerable measure, fluctuate over a number of such replacement cycles. Further investigations have shown that such fluctuations of the measuring accuracies can be attributed, among other things, to the fact that, because of unpreventable tolerances in the production of the second transducer-module, individual examples of the second transducer-module can have correspondingly high variations, or scatter; this, especially, also in such a manner that the middle-segments of individual examples of the at least one tube differ from a predetermined perfectly planar (tube-)shape, namely a shape having a directrix extending completely in the first reference plane, such that, as a result, the directrix of the channel surface of the middle-segment extends, (even) in the case of tube in static rest position, partially outside of the first reference plane of the measuring transducer, in given cases, even intersects the first reference plane once or a number of times. As a result of such scatter of the (tube-)shape in the case of conventional measuring transducers, the second and third reference planes of individual measuring transducer(-examples) can be shifted enough parallel to one another that the reference planes have, on the one hand, different separations and that, on the other hand, these separations can, at times, be very large, namely greater than 1 mm. Alternatively thereto, the second and third reference planes of such measuring transducer(-examples) can be rotated enough relative to one another that they intersect one another at an, at times, very large angle, namely angles amounting to greater than 1°. Associated therewith, also a smallest separation between tube wall and coil, consequently a (smallest) separation between a front face of the coil facing the permanent magnet and a front face of the permanent magnet facing the coil, can, on the one hand, have a significant deviation from a predetermined nominal value, consequently a correspondingly high individual variation, and the separation between coil and permanent magnet can, on the other hand, at times, also assume relatively high values, consequently fluctuate to a relatively high extent.

SUMMARY

Taking this into consideration, an object of the invention is so to improve modular measuring transducers of the aforementioned type that vibronic measuring systems formed therewith yield a constant high accuracy of measurement, even in spite of high variations in the (tube-)shape of the at least one tube, consequently correspondingly high variations in the second transducer-modules formed therewith; this, especially, also in the case of a large number of replacement cycles, in the case of which used examples of the second transducer-module are replaced with new examples of the second transducer-module.

For achieving the object, the invention resides in a measuring transducer of vibration-type, comprising:
  a first transducer-module, which includes a transducer-housing having at least one chamber surrounded, at least partially, by a housing wall as well as at least a first electrical coil, for example, a cylindrical, first electrical coil, placed within the chamber of the transducer-housing and mechanically connected, at least indirectly, with the housing wall; as well as
  a second transducer-module, which includes at least a (first) tube (for example, an at least sectionally straight and/or at least sectionally bent, (first) tube) having a tube wall forming an outer, lateral surface of the tube, for example, a tube wall of metal or plastic, and having a lumen surrounded by the tube wall, as well as at least a first permanent magnet (for example, a cylindrical, first permanent magnet) secured externally on a middle-segment of the tube wall extending between a, for example, inlet side, first segment-end and a, for example, outlet side, second segment-end spaced therefrom and connected therewith, for example, by material bonding.
  In the case of the measuring transducer of the invention, the second transducer-module is set in the first transducer-module and mechanically releasably securely connected therewith, in such a manner that at least the middle-segment of the tube is located within the chamber of the transducer-housing, and, equally as well, spaced from the housing wall, for example, in such a manner that the second transducer-module sits fixed within the first transducer-module, and is not movable, and the tube is adapted to convey in its lumen a flowing fluid, for example, a fluid having a predeterminable flow direction and/or a flow direction pointing from the first segment-end to the second segment-end, and during that to be caused to vibrate, in such a manner that the middle-segment executes oscillatory movements about a static rest position.
  The measuring transducer includes, furthermore, a number of imaginary reference axes, of which
  a first reference axis imaginarily connects a midpoint of a planar first cross sectional area of the middle-segment comprising a flow cross section of the first segment-end and a midpoint of a planar second cross sectional area of the middle-segment comprising a flow cross section of the second segment-end,
  a second reference axis coincides with a longitudinal axis of the electrical coil, and is determined by such longitudinal axis,
  a third reference axis coincides with a longitudinal axis of the permanent magnet, and is determined by such longitudinal axis,
  a fourth reference axis intersects both the first reference axis as well as also the second reference axis, in each case, at right angles, and
  a fifth reference axis intersects both the first reference axis as well as also the third reference axis, in each case, at right angles,
  wherein the tube wall, consequently the tube formed therewith, is so formed that, particularly because of tolerances in the production of the second transducer-module, a directrix of a channel surface of the middle-segment determined by the outer, lateral surface of the tube, for example, also a directrix imaginarily connecting the midpoints of the first and second cross sectional areas, extends, (also) in static rest position, at least partially, outside of an imaginary first reference plane of the measuring transducer defined by the first and fourth reference axes, for example, intersects the imaginary first reference plane one or more times.

In the case of the measuring transducer of the invention, additionally, the permanent magnet is so placed on the middle-segment, for example, so positioned and so oriented, that, in static rest position of the tube, an imaginary second reference plane of the measuring transducer defined by the second and fourth reference axes is in parallel with an imaginary third reference plane of the measuring transducer defined by the third and fifth reference axes, for example, in such a manner that the second and third reference planes coincide (a=0) or have a separation (a), which amounts to no more than 0.5 mm, for example, no more than 0.1 mm, or, that, in static rest position of the tube, the second and third reference planes imaginarily intersect one another to form a (smallest) angle of intersection, which amounts to no more than 1°, for example, no more than 0.5°.

Moreover, the invention resides also in a vibronic measuring system, for example, a Coriolis-mass flow-measuring device, formed by means of such a measuring transducer, which measuring system comprises, additionally, a measuring system-electronics electrically connected, for example, releasably, to the at least one coil, and adapted to supply electrical power to the coil by means of an electrical driver signal, for example, an electrical driver signal having an imposed alternating electrical current, and/or to sense an electrical (alternating-)voltage of the coil, for example, an electrical voltage representing oscillations of the middle-segment, for example, to evaluate oscillations of the middle-segment based on the (alternating-)voltage and/or to ascertain measured values of at least one measured variable of a fluid flowing in the tube.

In a first embodiment of the invention, it is, additionally, provided that the second transducer-module is formed replaceably, in such a manner that it is removable from the first transducer-module, for example, without damage, for example, it is removable from outside of the transducer-housing.

In a second embodiment of the invention, it is, additionally, provided that the measuring transducer has a sixth reference axis, which intersects both the third reference axis as well as also the directrix, in each case, at right angles, and the third and sixth reference axes define an imaginary fourth reference plane of the measuring transducer. Developing this embodiment, it is, furthermore, provided that the middle-segment has a third cross sectional area spaced both from the first segment-end as well as also from the second segment-end and having a (surface-)normal, for example, a (surface-)normal pointing essentially in a flow direction of a flowing fluid conveyed in the tube, and a flow cross section, whose midpoint corresponds to, or coincides with, the intersection of the sixth reference axis with the directrix; this, especially, in such a manner that the third reference axis and the (surface-)normal of the flow cross section of the third cross sectional area are skew that, for example, the sixth reference axis corresponds to a minimum traverse of the (surface-)normal and the third reference axis, and/or in such a manner that the flow cross section of the third cross sectional area and the fourth reference plane imaginarily intersect one another to form a (smallest) angle of intersection different from zero, for example, amounting to greater than 0.1°.

In a third embodiment of the invention, it is, additionally, provided that the second and third reference axes are parallel, for example, coincide.

In a fourth embodiment of the invention, it is, additionally, provided that the at least one tube is mechanically coupled, for example, rigidly, with the transducer-housing by means of a, for example, inlet side, first connection-segment adjoining the first segment-end of the middle-segment and by means of a, for example, outlet side, second connection-segment adjoining the second segment-end of the middle-segment, namely connected in such a manner with the transducer-housing that shifting of the first and second connection-segments relative to the transducer-housing is prevented and/or that the second transducer-module sits fixed within the first transducer-module, and is not movable.

In a fifth embodiment of the invention, it is, additionally, provided that the at least one tube (for example, its middle-segment, and the directrix) is formed U-shaped- or V-shaped in projection on the first reference plane.

In a sixth embodiment of the invention, it is, additionally, provided that the second transducer-module further comprises at least a second tube constructed equally to the first tube and/or identical to the first tube, placed within the transducer-housing and connected mechanically, for example, releasably, therewith.

In a seventh embodiment of the invention, it is, additionally, provided that the electrical coil and the permanent magnet form a solenoid.

In an eighth embodiment of the invention, it is, additionally, provided that the electrical coil and the permanent magnet form a plunger coil.

In a first further development of the invention, the measuring transducer further comprises: an electromechanical exciter arrangement for exciting and maintaining forced oscillations of the middle-segment of the at least one tube. The exciter arrangement can be formed, for example, by means of the electrical coil and by means of the permanent magnet.

In a second further development of the invention, the measuring transducer further comprises: an electromechanical sensor arrangement for registering forced oscillations of the middle-segment of the at least one tube and for providing at least one oscillation signal representing the oscillations of the middle-segment. The sensor arrangement can be formed, for example, by means of the electrical coil and by means of the permanent magnet.

A basic idea of the invention is to lessen an influence damaging for the accuracy of measurement of vibronic measuring systems of the invention caused by an inherently high example scatter in the examples of the at least one tube used for producing a large number of second transducer-modules by mounting, namely so positioning and orienting, the at least one permanent magnet, for example, also each of the permanent magnets serving for forming the sensor- and/or exciter arrangement of the finally produced example of the modular measuring transducer so on the middle-segment of the tube that the permanent magnet, although the middle-segment of the example of the tube differs from a predetermined, for example, perfectly planar, (tube-)shape non-systematically, consequently non-predictabley, is placed in a final installed position within the example of the therewith readied measuring system at a predetermined location and orientation relative to its coil in the first transducer-module; this especially also in such a manner that, associated therewith, (and in contrast with conventional second transducer-modules, or measuring transducer formed therewith) the (fourth) reference plane of the measuring transducer defined by the longitudinal axis of the permanent magnet as well as the (sixth) reference axis perpendicularly intersecting the directrix of the channel surface of the middle-segment and the cross sectional area of the middle-segment lying with its midpoint at the intersection of the (sixth) reference axis with the directrix are neither coplanar nor parallel, but, instead, imaginarily intersect one another to form a (smallest) angle of intersection significantly different from zero, namely amounting to greater than 0.1°, and that the (surface-)normals of such cross sectional area and the (fourth) reference plane of the measuring transducer are skew. The invention is based on, among other things, also the surprising recognition that the separation, in the case of readied measuring transducer(-example), established between the front face of the coil facing the permanent magnet and the front face of the permanent magnet facing the coil provides, on the one hand, a very high contribution to the accuracy of measurement achievable with the measuring system, and that, on the other hand, the separation, although to the detriment of a simple positioning and orientation of the permanent magnet in the case of conventional measuring transducers in the above-described manner, can be checked and very exactly set during the manufacturing of modular measuring transducers with a comparatively small extra effort. As a result of such a relatively easy to implement, slightly different positioning of the permanent magnet in the case of vibronic measuring systems of the type being discussed, a considerable improvement of the measuring accuracy, and a constant high accuracy of measurement, can be achieved, even over a large number of replacement cycles of the aforementioned type.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from the claims per se.

The figures of the drawings show as follows.

DETAILED DESCRIPTION

Figures 1A, 1B:
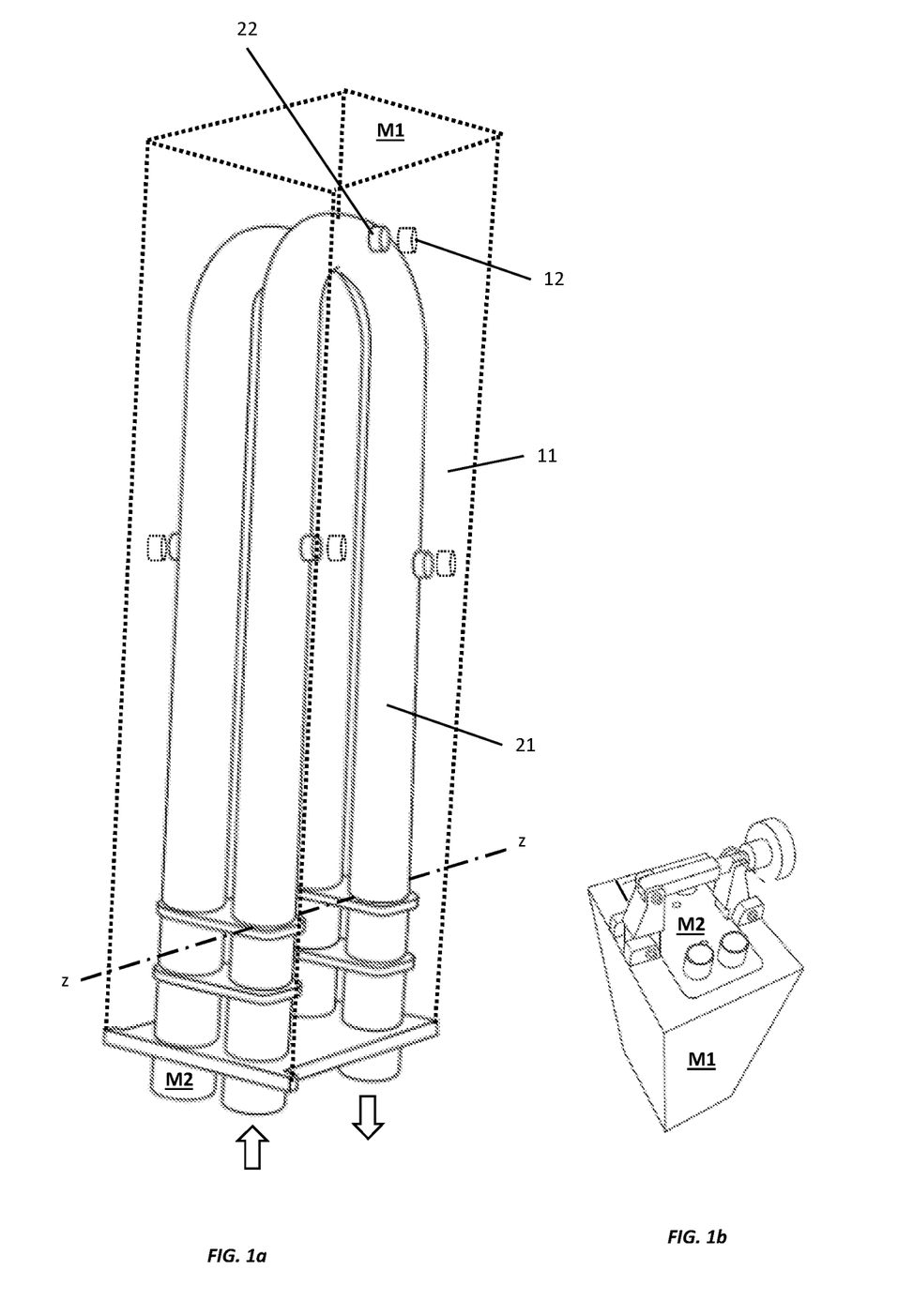
FIG. 1a shows, schematically in a perspective, partially also transparent, side view, a modular vibration-type measuring transducer including two transducer-modules and forming a vibronic measuring system.
FIG. 1b shows, schematically in a perspective side view, a variant of a modular vibration-type measuring transducer.

Shown in FIGS. 1a and 1b are examples of embodiments of measuring transducers of vibration-type.

These measuring transducers are modularly constructed, in such a manner that they comprise a first transducer-module M1 as well as a second transducer-module M2.

Transducer-module M1 of the measuring transducer of the invention includes a transducer-housing 11 having at least one chamber 11* surrounded, at least partially, by a housing wall 11+, as well as at least a first electrical coil 12, for example, an essentially cylindrical, electrical coil, placed within the chamber 11* and mechanically connected, at least indirectly, with the housing wall 11+. Transducer-module M2, in turn, includes at least a, for example, at least sectionally straight and/or at least sectionally bent, (first) tube 21 as well as at least a, for example, essentially cylindrical, first permanent magnet 22. The, for example, essentially U- or V-shaped tube 21 comprises a tube wall 21+, for example, of a metal or a plastic, forming an outer, lateral surface of the tube 21, as well as a lumen 21* surrounded by the tube wall 21+. Additionally, the permanent magnet 22, for example, by material bonding, is secured externally on a middle-segment 21a of the tube wall extending between a, here, inlet side, first segment-end and a, here, outlet side, second segment-end spaced from the first segment-end.

As shown in FIG. 1a, or directly evident from a combination of FIGS. 1a, 1b, 2 and 3, in the case of readied measuring transducer, the transducer-module M2 is set in the transducer-module M1 and securely connected, mechanically releasably, therewith, in such a manner that at least the middle-segment 21a of the tube is situated within the chamber of the transducer-housing 11, equally as well, spaced from its housing wall 11+; this, especially, in such a manner that the transducer-module M2 sits fixed within the transducer-module M1, and is not movable, and/or in such a manner that the electrical coil 12 and the permanent magnet 22 form a solenoid, or plunger coil. In an additional embodiment, the transducer-modules M1, M2 are so formed that, in the case of transducer-module M2 arranged and secured in final installed position in the transducer-module M1, the at least one tube is mechanically coupled with the transducer-housing by means of a—here, inlet side—first connection-segment 21b adjoining the first segment-end of the middle-segment and by means of a—here, outlet side—second connection-segment 21c adjoining the second segment-end of the middle-segment; this, especially, in such a manner that the at least one tube is connected rigidly with the transducer-housing 11, namely in such a manner that shifting of the above described connection-segments 21b, 21c relative to the transducer-housing 11 is prevented, or that the transducer-module M2 sits fixed, and is not movable, within the transducer-module M1. In an additional embodiment of the invention, the transducer-module M2 is, additionally, formed replaceably, in such a manner that (after its installation in the transducer-module M1) it can be removed from the transducer-module M1; this, especially, in such a manner that it is removable from the transducer-housing 11, or from the transducer-module M1 formed therewith, without damage to, and/or from outside of, the transducer-housing 11,—such as indicated in FIG. 1b—, in given cases, also without application of (assembly/disassembly-)tools, for instance, in order on-site to be replaced by another example of the second transducer-module (M2*), in given cases, even one produced after production and delivery of the transducer-module M1.

Figure 2:
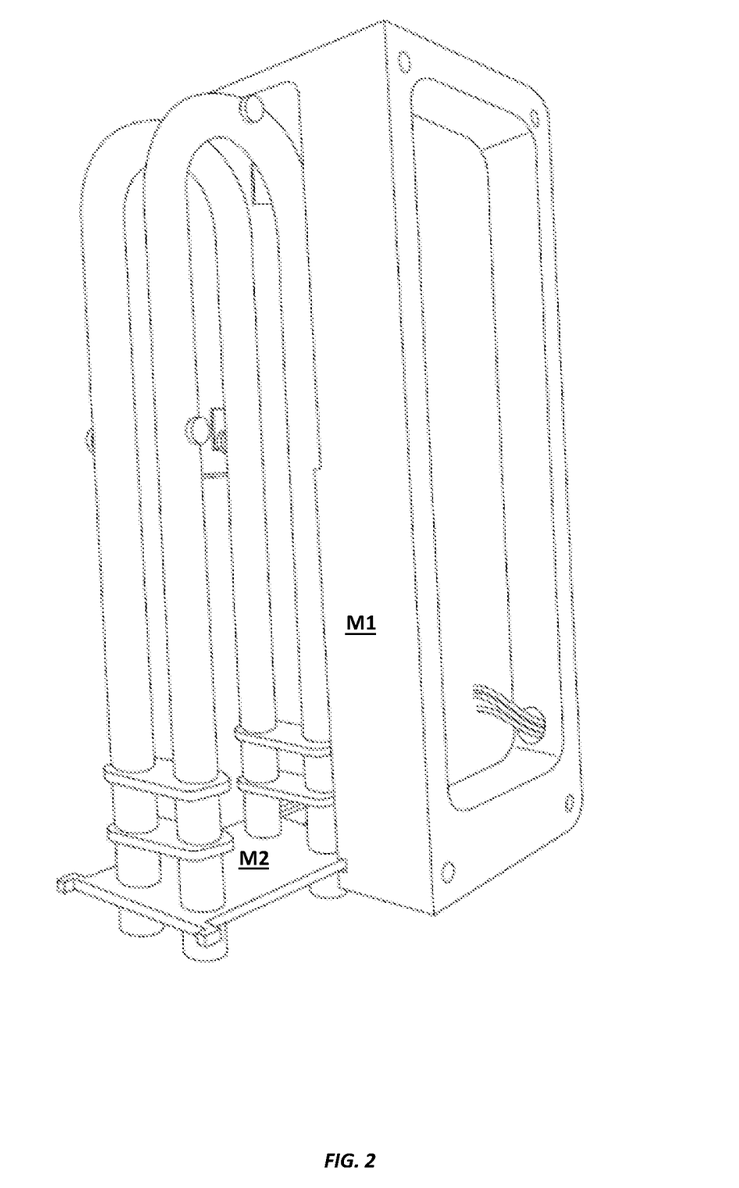
FIGS. 2 and 3 show, schematically in perspective side views, first and second transducer-modules suitable for forming the measuring transducers of FIGS. 1a and 1b.
Figure 3:
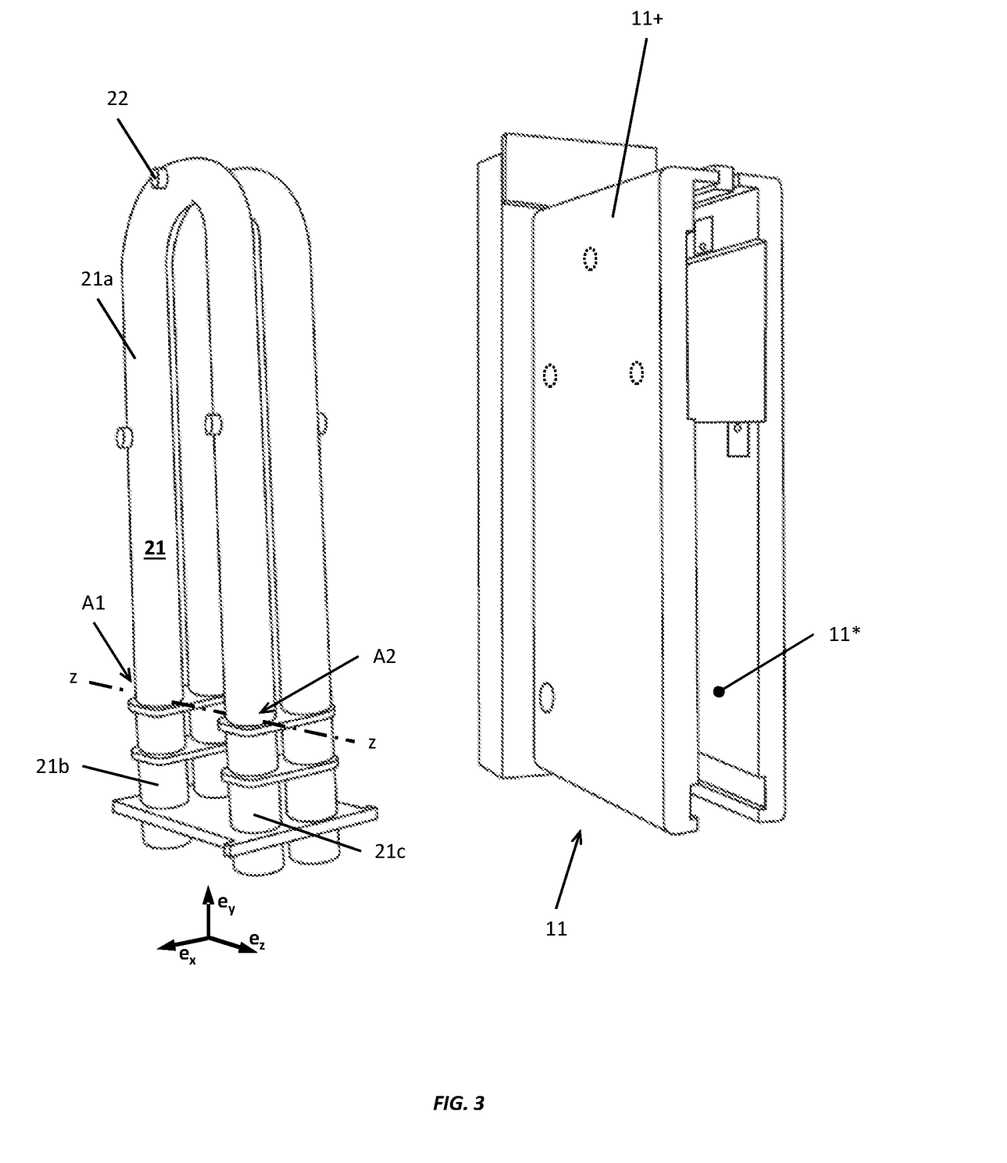

The tube 21 of the measuring transducer of the invention is adapted, furthermore, to convey in its lumen a fluid flowing, for example, with a predeterminable flow direction and/or directed from the above described, first segment-end to the above described, second segment-end, and during that to be caused to vibrate, in such a manner that the middle-segment 21a executes oscillatory movements from a static rest position (here defined by the installed position of the transducer-module M2 within the transducer-module M1). Accordingly, in an additional embodiment of the invention, the measuring transducer further comprises an electromechanical exciter arrangement for exciting and maintaining forced oscillations of the middle-segment of the at least one tube and/or an electromechanical sensor arrangement for registering forced oscillations of the middle-segment of the at least one tube and for providing at least one oscillation signal representing the oscillations of the middle-segment, wherein the exciter arrangement or the sensor arrangement can be formed, for example, by means of the electrical coil 12 and by means of the permanent magnet 22. The measuring transducer of the invention can, accordingly, for example, additionally, also be a component of a vibronic measuring system, for example, a Coriolis-mass flow-measuring device, which besides the measuring transducer comprises a measuring system-electronics electrically connected, for example, also releasably, to its at least one coil 21. The measuring system-electronics can, in turn, such as quite usual in the case of such vibronic measuring systems, for example, be adapted to supply electrical power to the coil by means of an electrical driver signal, for example, one having an imposed alternating electrical current, and/or to sense an, electrical (alternating-)voltage of the coil, especially a voltage representing oscillations of the middle-segment; this, especially, in order based on the (alternating-) voltage oscillations of the middle-segment to evaluate and/or to ascertain measured values of at least one measured variable of a fluid flowing in the tube 21. Besides the tube 12, the transducer-module M2 can, as well as also indicated in FIGS. 1a, 2, and 3, in each case, have placed within the transducer-housing 11, furthermore, at least a second tube equally constructed and/or identical to the tube 21 and mechanically connected therewith, in given cases, also releasably. The second tube can, such as quite usual in the case of such measuring transducers, or measuring system formed therewith, for example, be arranged parallel to the tube 21 and/or be connected for flow parallel to that of the tube 21, for example, in such a manner that the then at least two tubes of the measuring transducer during operation convey simultaneously two fractions of the same fluid and during that are caused to vibrate. Alternatively or supplementally, the measuring transducer can, additionally, have a plurality of other such coil-magnet-arrangements formed by means of paired electrical coils and permanent magnets, for example, in such a manner that the measuring transducer has —, as well as also indicated schematically in FIG. 1a and as quite usual in the case of measuring transducers of the type being discussed—at least two other coils, especially coils equally to the coil 12 mechanically connected with the housing wall 11+ and/or essentially constructed equally to the coil 12—as well as accordingly at least two other permanent magnets, especially permanent magnets, equally to the permanent magnet 22, mounted on the middle-segment 21a and/or essentially constructed equally to the permanent magnet 22—and/or in such a manner that the measuring transducer has per tube, in each case, three mutually spaced permanent magnets as well as, in each case, three mounted electrical coils located opposite on the housing 11.

Figure 4:
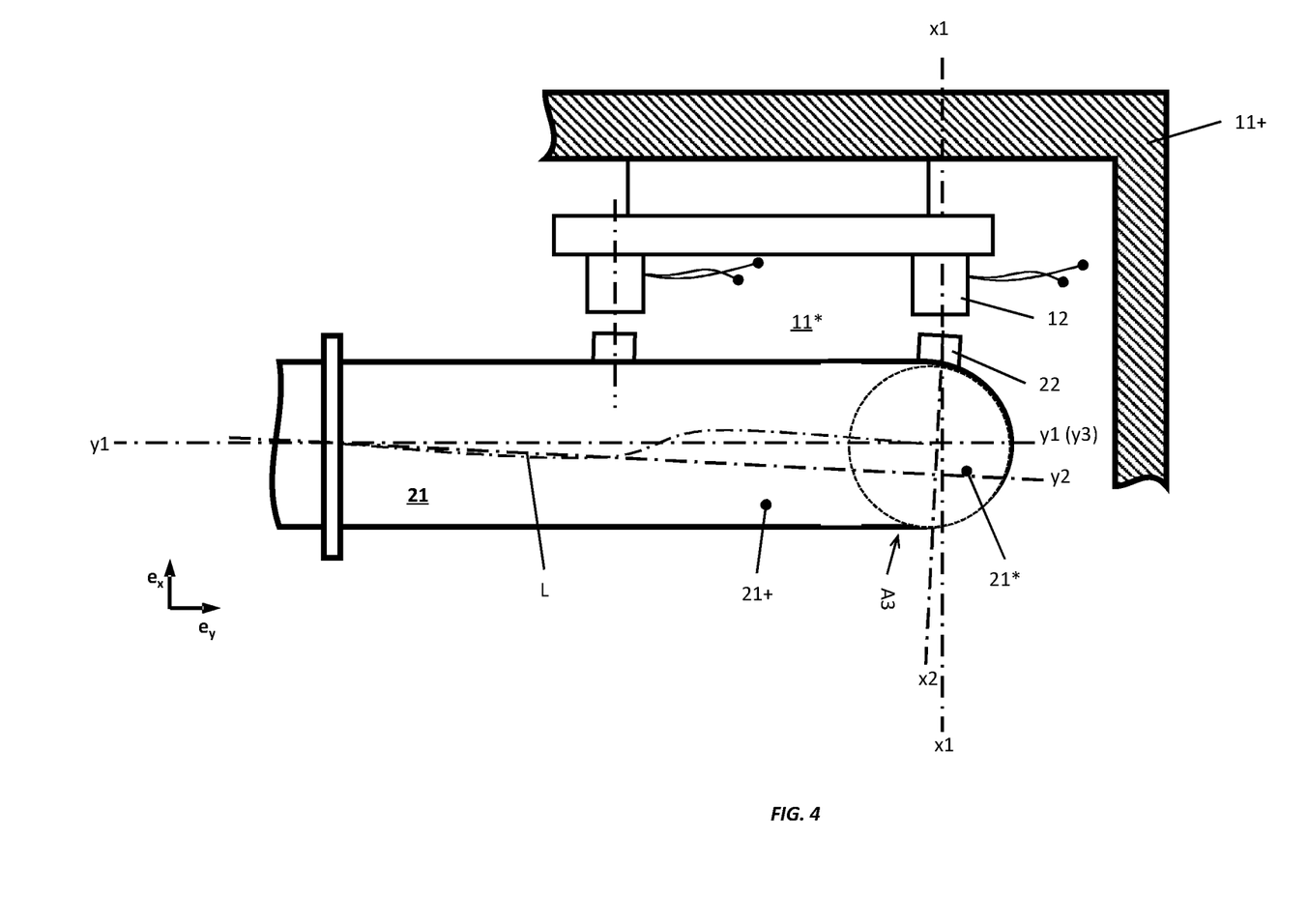
FIGS. 4, 5 and 6 show schematically and partially sectioned, side views of details for forming the first and second transducer-modules of FIGS. 1, 2 and 3.
Figure 5:
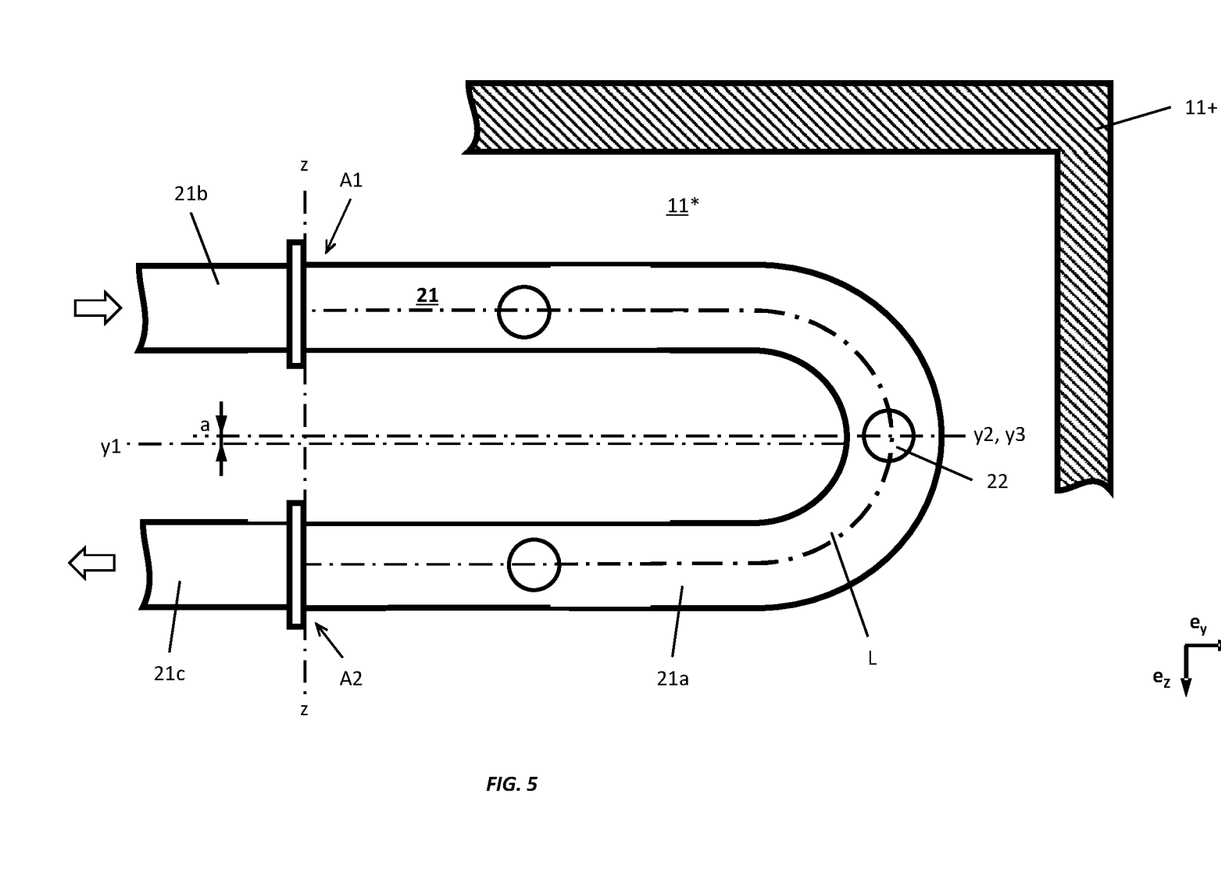

Naturally, the measuring transducer has —, as well as also indicated, in each case, in FIGS. 1a, 4, 5 and 6, or as directly evident from their combination—a number of imaginary reference axes, in such a manner that a first reference axis z (extending in FIGS. 1a, 3, 5 and 6, in each case, in the direction e z) imaginarily connects a midpoint of a planar first cross sectional area of the middle-segment comprising a flow cross section A1 of the first segment-end and a midpoint of a planar second cross sectional area of the middle-segment 21a comprising a flow cross section A2 of the second segment-end (FIGS. 1a, 5, and 6), that a second reference axis x1 (extending in FIGS. 3, 4 and 6, in each case, in the direction e x) coincides with a longitudinal axis of the electrical coil 12, or is established by the longitudinal axis (FIGS. 4, and 6), that a third reference axis x2 coincides with a longitudinal axis of the permanent magnet 22, or is established by the longitudinal axis (FIGS. 4, and 6), that a fourth reference axis y1 (extending in FIGS. 3, 4 and 5, in each case, in the direction $e_y$) intersects both the reference axis z as well as also the reference axis x1, in each case, at right angles, namely with an angle of intersection of 90° (FIGS. 4 and 5), and a fifth reference axis y2 intersects both the reference axis z as well as also the reference axis x2, in each case, at right angles (FIGS. 4 and 5). Moreover, the measuring transducer has, furthermore, also a sixth reference axis y3, which —, as well as also indicated in FIGS. 4 and 5, or evident from their combination—intersects both the reference axis x2 as well as also the directrix L, in each case, at right angles.

Figure 6:
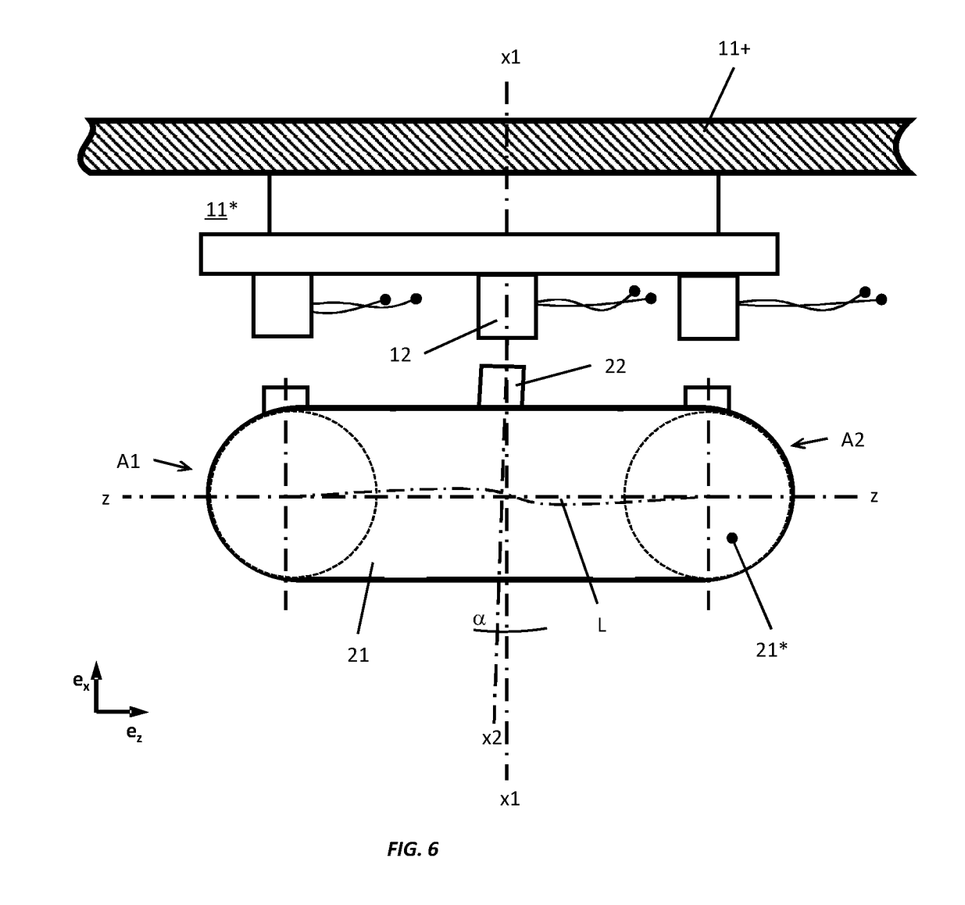

Additionally, the tube wall 21+, consequently the tube 21 formed therewith, is also so formed—particularly because of tolerances in the production of the transducer-module M2, or of the tube 21,—that a directrix L (here, among other things, also imaginarily connecting the midpoints of the above described, first and second cross sectional areas) of a channel surface of the middle-segment 21a established by the outer, lateral surface of the tube extends also in static rest position, at least partially, outside of an imaginary first reference plane (yz1) of the measuring transducer defined by the reference axis z and the reference axis y1; this, especially, also in such a manner that the directrix L, especially in a regularly non-predictable and, additionally, also not directly verifiable extent, intersects the reference plane (yz1) one or more times. As a result of this, also a curve of a lateral separation between the directrix L and the housing wall has corresponding irregularities, which are inherently not directly verifiable; this, especially, also in such a manner that a smallest separation between the coil 12 and the tube wall, and the tube formed therewith, can be predetermined only approximately, and that, measured over a large number of successive measuring systems, or measuring system-examples, formed by means of one and the same example of the transducer-module M1 as well as a plurality of examples of the transducer-module M2, the smallest separation can have a relatively high scatter. For lessening of the influence of the above described production related irregularities of the (tubular-)shape of the middle-segment 21a, or the related scatter of the above described smallest separation between coil 12 and tube wall, the permanent magnet of the measuring transducer of the invention is so mounted, especially so positioned and so oriented, on the middle-segment 21a that in static rest position of the tube an imaginary second reference plane (xy1) of the measuring transducer defined by the reference axis x1 and the reference axis y1 is parallel to an imaginary third reference plane (xy2) of the measuring transducer defined by the reference axis x2 and the reference axis y2 or that —, as well as also indicated in FIG. 6—in static rest position of the tube, the second and third reference planes imaginarily intersect one another, at most, to form a (smallest) angle of intersection a, which amounts to no more than 1°, for example, no more than 0.5°. For the above-described case, in which the imaginary second and third reference planes (xy1, xy2) of the measuring transducer are parallel relative to one another, a separation between the reference planes is advantageously so measured, that it amounts to no more than 0.5 mm, especially no more than 0.1 mm, ideally namely is zero (a=0), such that, thus, the reference plane xy1 and the reference plane xy2 coincide. Additionally, the reference axis x2 and the reference axis y3 define an imaginary fourth reference plane xy3 of the measuring transducer and the middle-segment 21a has a third cross sectional area A3 spaced both from the first segment-end as well as also from the second segment-end and having a (surface-)normal, especially a (surface-)normal pointing during operation of the measuring system essentially in the flow direction of the flowing fluid conveyed in the tube, and having a flow cross section, whose midpoint corresponds to, or coincides with, the intersection of the reference axis y3 with the directrix L. The at least one tube 21 can, furthermore, for example, be so formed that (in the case of readied measuring transducer) at least the middle-segment 21a, or the directrix L in projection on the above-mentioned reference plane yz1, is V-shaped, or, as shown in FIG. 5, U-shaped.

In an additional embodiment of the invention, the permanent 22 is, furthermore, so mounted on the middle-segment 21a that reference axis y3 and the above-mentioned (surface-)normal of the flow cross section of the cross sectional area A3 are skew, for example, in such a manner that the reference axis y3 corresponds to a minimum traverse of the (surface-)normal and the reference axis x2 and/or that the flow cross section of the cross sectional area A3 and the reference plane xy3 imaginarily intersect one another to form a (smallest) angle of intersection different from zero, for example, amounting to greater than 0.1°. Alternatively thereto or in supplementation thereof, the permanent magnet 22 in an additional embodiment of the invention is, furthermore, so mounted on the middle-segment 21a that in the case of transducer-module M2 installed in the transducer-module M1, the reference axis x1 is parallel to the reference axis x2 or coincides therewith.

The reference axes z, x1, and y1 required in the factory manufacturing of the transducer-module M2 (consequently away from the transducer-module M1) for the exact positioning and orientating of the permanent magnets 21 on the middle-segment 21a, equally as well established in the transducer-module M1, can, for example, be provided in the manufacturing in a correspondingly calibrated assembly setup for the transducer-module M2, namely a setup exactly mimicking at least installed position and location of the transducer-module M2 in the transducer-module M1 as well as exactly replicating position and location of the electrical coil 12 in the transducer-module M1. Derived from the reference axes z, x1 and y1, then also the reference axes x2, y2 can be predetermined in the assembly setup by means of corresponding positioning- and adjusting elements and/or in the form of corresponding markings, for example, also in the form of reference point and/or -lines correspondingly generated by laser rays.

The invention claimed is:

1. A measuring transducer of a vibration type, comprising:
   a first transducer module, comprising:
      a transducer housing defining at least one chamber surrounded, at least partially, by a housing wall; and
      a cylindrical electrical coil disposed within the at least one chamber and mechanically connected, at least indirectly, with the housing wall; and
   a second transducer module, comprising:
      a first tube, which is at least sectionally straight and/or at least sectionally bent, the first tube including:
         a tube wall forming an outer, lateral surface of the tube, wherein the tube wall is metal or plastic;
         a lumen surrounded by the tube wall; and
         a cylindrical permanent magnet,
         wherein the permanent magnet is secured externally on a middle segment of the tube wall extending between an inlet side, first segment end and an outlet side, second segment end, spaced therefrom and connected therewith by material bonding;
      wherein the second transducer module is set in the first transducer module and mechanically, releasably, securely connected therewith such that at least the middle segment of the tube wall is disposed within the at least one chamber of the transducer housing and is spaced from the housing wall such that the second transducer module sits unmovably fixed within the first transducer module, and
      wherein the first tube is configured to convey in the lumen a flowing fluid having a predeterminable flow direction and/or a flow direction pointing from the first segment end to the second segment end and is configured to be caused to vibrate such that the middle segment executes oscillatory movements about a static rest position;
   wherein the measuring transducer includes imaginary reference axes, of which:
      a first reference axis imaginarily connects a midpoint of a planar first cross-sectional area of the middle segment comprising a flow cross-section of the first segment end and a midpoint of a planar second cross-sectional area of the middle segment comprising a flow cross-section of the second segment end;
      a second reference axis coincides with a longitudinal axis of the electrical coil and is defined by such longitudinal axis;
      a third reference axis coincides with a longitudinal axis of the permanent magnet, and is defined by such longitudinal axis;
      a fourth reference axis intersects both the first reference axis and the second reference axis, each at right angles; and
      a fifth reference axis intersects both the first reference axis and the third reference axis, each at right angles,
   wherein the tube wall, and the tube formed thereby, is shaped such that, because of tolerances in the manufacture of the second transducer module, a directrix of a channel surface of the middle segment, which channel surface is defined by the outer lateral surface of the tube, and which directrix imaginarily connects the midpoints of the first and second cross-sectional areas, extends in static rest position, at least partially, outside of an imaginary first reference plane of the measuring transducer defined by the first and fourth reference axes and intersects the imaginary first reference plane one or more times,
   wherein the measuring transducer further includes a sixth reference axis that intersects both the third reference axis and the directrix, each at right angles,
   wherein the middle segment of the tube wall of the second transducer module has a third cross-sectional area spaced from both the first segment end and the second segment end, the third cross-sectional area having a normal pointing in the flow direction and having a flow cross-section whose midpoint corresponds to, or coincides with, the intersection of the sixth reference axis with the directrix,
wherein the permanent magnet is disposed on the middle-segment such that:
in static rest position of the tube, an imaginary second reference plane of the measuring transducer defined by the second and fourth reference axes is parallel to an imaginary third reference plane of the measuring transducer defined by the third and fifth reference axes, such that the second and third reference planes coincide or have a separation that is no more than 0.5 mm; or
in static rest position of the tube, the second and third reference planes imaginarily intersect each other to define an angle of intersection that is no more than 1°, and
wherein the third and sixth reference axes define an imaginary fourth reference plane of the measuring transducer, and the flow cross-section of the third cross sectional area and the fourth reference plane imaginarily intersect each other to form an angle of intersection different from zero.

2. The measuring transducer of claim 1, wherein the third reference axis and the normal of the flow cross-section of the third cross-sectional area are skewed such that the sixth reference axis corresponds to a minimum traverse of the normal and the third reference axis.

3. The measuring transducer of claim 1, wherein the second and third reference axes are parallel.

4. The measuring transducer of claim 1, wherein the tube is mechanically coupled with the transducer housing via an inlet side, first connection segment adjoining the first segment end of the middle segment and via an outlet side, second connection segment adjoining the second segment end of the middle segment, such that displacement of the first and second connection segments relative to the transducer housing is prevented and/or that the second transducer module is fixedly seated within the first transducer module and is not movable.

5. The measuring transducer of claim 1, wherein the middle segment or the directrix of the tube is U-shaped or V-shaped in projection onto the first reference plane.

6. The measuring transducer of claim 1, wherein the electrical coil and the permanent magnet form a solenoid or a plunger coil.

7. The measuring transducer of claim 1, further comprising an electromechanical exciter arrangement configured to excite and maintain forced oscillations of the middle segment of the tube.

8. The measuring transducer of claim 7, wherein the exciter arrangement includes the electrical coil and the permanent magnet.

9. The measuring transducer of claim 1, further comprising an electromechanical sensor arrangement configured to register forced oscillations of the middle segment of the tube and to generate at least one oscillation signal, which represents the oscillations of the middle segment.

10. The measuring transducer of claim 9, wherein the sensor arrangement includes the electrical coil and the permanent magnet.

11. The measuring transducer of claim 1, wherein the second transducer module is replaceable as to be removable from the first transducer module in a non-destructive manner from outside of the transducer housing.

12. The measuring transducer of claim 1, wherein the second transducer module further comprises at least one second tube constructed equally to the first tube and/or disposed in the same manner within the transducer housing and connected mechanically and releasably therewith.

13. A Coriolis mass flow measuring device, comprising:
a measuring transducer according to claim 1;
a measuring system electronics electrically and releasably connected to the electrical coil, wherein the measuring system electronics is configured to, at least one of:
supply electrical power to the electrical coil via an electrical driver signal having an imposed alternating electrical current;
detect an electrical voltage of the electrical coil representing oscillations of the middle segment;
evaluate oscillations of the middle segment based on the electrical voltage; and
determine measured values of at least one measured variable of the fluid flowing in the tube.

* * * * *